United States Patent
Namekawa et al.

(10) Patent No.: US 8,620,209 B2
(45) Date of Patent: Dec. 31, 2013

(54) COMMUNICATION APPARATUS, COMMUNICATION SYSTEM, COMMUNICATION METHOD, AND PROGRAM

(75) Inventors: Nobuo Namekawa, Kanagawa (JP); Jun Iwasaki, Tokyo (JP); Satoshi Konya, Kanagawa (JP); Tomonari Yamagata, Kanagawa (JP); Hiroaki Miyachi, Tokyo (JP)

(73) Assignee: Sony Corporation, Tokyo (JP)

( * ) Notice: Subject to any disclaimer, the term of this patent is extended or adjusted under 35 U.S.C. 154(b) by 311 days.

(21) Appl. No.: 12/470,616

(22) Filed: May 22, 2009

(65) Prior Publication Data

US 2009/0291639 A1 Nov. 26, 2009

(30) Foreign Application Priority Data

May 23, 2008 (JP) ................... 2008-135971

(51) Int. Cl.
*H04B 3/36* (2006.01)
(52) U.S. Cl.
USPC .............................. 455/7; 455/41.1; 455/41.2
(58) Field of Classification Search
USPC .......................... 455/41.1; 370/315
See application file for complete search history.

(56) References Cited

U.S. PATENT DOCUMENTS

| | | | |
|---|---|---|---|
| 6,825,754 B1 * | 11/2004 | Rolin | 340/10.34 |
| 7,180,875 B1 * | 2/2007 | Neumiller et al. | 370/329 |
| 7,933,236 B2 * | 4/2011 | Wang et al. | 370/328 |
| 2006/0056457 A1 * | 3/2006 | Livet et al. | 370/475 |
| 2006/0293061 A1 * | 12/2006 | Kobayashi et al. | 455/455 |
| 2007/0120678 A1 * | 5/2007 | Posamentier | 340/572.7 |
| 2007/0202803 A1 * | 8/2007 | Miyoshi | 455/11.1 |

FOREIGN PATENT DOCUMENTS

| | | |
|---|---|---|
| JP | 2002-269508 | 9/2002 |
| JP | 2005-129110 | 5/2005 |
| JP | 2005-159958 | 6/2005 |
| JP | 2005-267184 | 9/2005 |
| JP | 2006-60283 | 3/2006 |
| WO | WO 2007/147448 A1 | 12/2007 |

* cited by examiner

*Primary Examiner* — Raymond Dean
(74) *Attorney, Agent, or Firm* — Finnegan, Henderson, Farabow, Garrett & Dunner, LLP (57) ABSTRACT

A communication apparatus, a communication system, a communication method, and a program capable of performing relay transfer of a data file swiftly and simply in performing short-distance one-to-one communication are provided. The communication apparatus includes a communication part that performs short-distance one-to-one communication with a communication partner apparatus via electric field coupling or magnetic field coupling, a relay transfer mode setting part that sets a relay transfer mode in which a data file are relay-transferred from at least one first apparatus to at least one second apparatus, a storage part that holds the data file received from the first apparatus while the relay transfer mode is set, and a transmission control part that transmits the data file held in the storage part to the second apparatus with which communication is established while the relay transfer mode is set.

21 Claims, 10 Drawing Sheets

COMMUNICATION APPARATUS, COMMUNICATION SYSTEM, COMMUNICATION METHOD, AND PROGRAM

BACKGROUND OF THE INVENTION

1. Field of the Invention

The present invention relates to a communication apparatus, a communication system, a communication method, and a program.

2. Description of Related Art

Recently, radio frequency communication methods specified by IEEE (Institute of Electrical and Electronic Engineers) 802.11 are widely employed.

In addition to the radio frequency communication methods, communication methods that perform communication via using electric field coupling or magnetic field coupling have been proposed. In such a communication method, for example, if a plurality of couplers that can be magnetically coupled is brought closer, the plurality of couplers is magnetically coupled and communication among the plurality of couplers is achieved via magnetic field coupling. Technology for communicating via magnetic field coupling is described, for example, in Japanese Patent Application Laid-Open No. 2006-60283.

SUMMARY OF THE INVENTION

When short-distance one-to-one communication is performed between two devices using a communication method that performs communication by using electric field coupling or magnetic field coupling, one device must be brought closer to the other. However, if the two devices are both of the stationary type, it is difficult to move the device bodies, and thus, it is difficult to reduce the distance between the devices. A stationary device is, for example, a personal computer, a home video processing apparatus (e.g. a DVD recorder and videocassette recorder), stereo components and the like. Therefore, it has been difficult to exchange a data file between two stationary devices using the above communication method. Thus, it can be considered to perform communication by bringing a mobile device using the proximity communication method closer to a stationary device using the proximity communication method to transmit a data file once from the stationary device to the mobile device and then transmitting the data file received by the mobile device to another stationary device.

When such a relay transfer is performed, an operation to select a data file is usually necessary in the mobile device. Then, the mobile device can transfer the data file selected by the selection operation to another device. However, in the mobile device, a data file that has just been acquired may clearly be specified. Thus, if a file selection operation for each relay transfer has to be performed, the user is required to perform a complicated procedure.

The present invention has therefore been made in view of the above issue and there is a need for a novel and improved communication apparatus, communication system, communication method, and program capable of relay transferring of a data file easily and simply during short-distance, one-to-one communication.

According to an embodiment of the present invention, a communication apparatus, including a communication part that performs short-distance one-to-one communication with a communication partner apparatus via electric field coupling or magnetic field coupling, a relay transfer mode setting part that sets a relay transfer mode in which a data file is relay-transferred from at least one first apparatus to at least one second apparatus, a storage part that holds the data file received from the first apparatus while the relay transfer mode is set, and a transmission control part that transmits the data file held in the storage part to the second apparatus with which communication is established while the relay transfer mode is set, is provided.

The communication apparatus may include an input part into which a release instruction of the relay transfer mode is input, and the relay transfer mode setting part may release the relay transfer mode when the release instruction is input into the input part.

The communication apparatus may include a time counter that determines whether a timeout has occurred, and the relay transfer mode setting part may release the relay transfer mode when the timeout occurs in the time counter.

The transmission control part may transmit a data file to the second apparatus with which communication is established after a reception end of the data files is input from the first apparatus.

The communication apparatus may include a display processing part for displaying a setting or release of the relay transfer mode.

Furthermore, according to another embodiment of the present invention, a communication system, including a first communication apparatus that communicates with a second communication apparatus using short-distance one-to-one communication via electric field coupling or magnetic field coupling, the second communication apparatus having a communication part that communicates with the first communication apparatus or a third communication apparatus using the short-distance one-to-one communication via electric field coupling or magnetic field coupling, a relay transfer mode setting part that sets a relay transfer mode in which a data file is relay-transferred from the first communication apparatus to the third communication apparatus, a storage part that holds the data file received from the first communication apparatus while the relay transfer mode is set, and a transmission control part that transmits the data files held by the storage part to the third communication apparatus with which communication is established while the relay transfer mode is set, and the third communication apparatus that is different from the first communication apparatus and that performs communication with the second communication apparatus using the short-distance one-to-one communication via electric field coupling or magnetic field coupling, is provided.

Furthermore, according to another embodiment of the present invention, a communication method, including the steps of: performing short-distance one-to-one communication with a communication partner apparatus via electric field coupling or magnetic field coupling; setting a relay transfer mode in which a data file is relay-transferred from at least one first apparatus to at least one second apparatus; holding the data file received from the first apparatus while the relay transfer mode is set; and transmitting the data file held in the storage part to the second apparatus with which communication is established while the relay transfer mode is set, is provided.

Furthermore, according to another embodiment of the present invention, a program causing a computer to function as a means for performing short-distance one-to-one communication with a communication partner apparatus via electric field coupling or magnetic field coupling, a means for setting a relay transfer mode in which a data file is relay-transferred from at least one first apparatus to at least one second apparatus, a means for holding the data file received from the first apparatus while the relay transfer mode is set, and a means for transmitting the data file held in the storage part to the at least one second apparatus with which communication is established while the relay transfer mode is set, is provided.

According to the present invention, a relay transfer of a data file can be performed easily and simply when short-distance one-to-one communication is performed.

DETAILED DESCRIPTION OF PREFERRED EMBODIMENTS

Hereinafter, preferred embodiments of the present invention will be described in detail with reference to the appended drawings. Note that, in this specification and the appended drawings, structural elements that have substantially the same function and structure are denoted with the same reference numerals, and repeated explanation of these structural elements is omitted.

Figure 1:
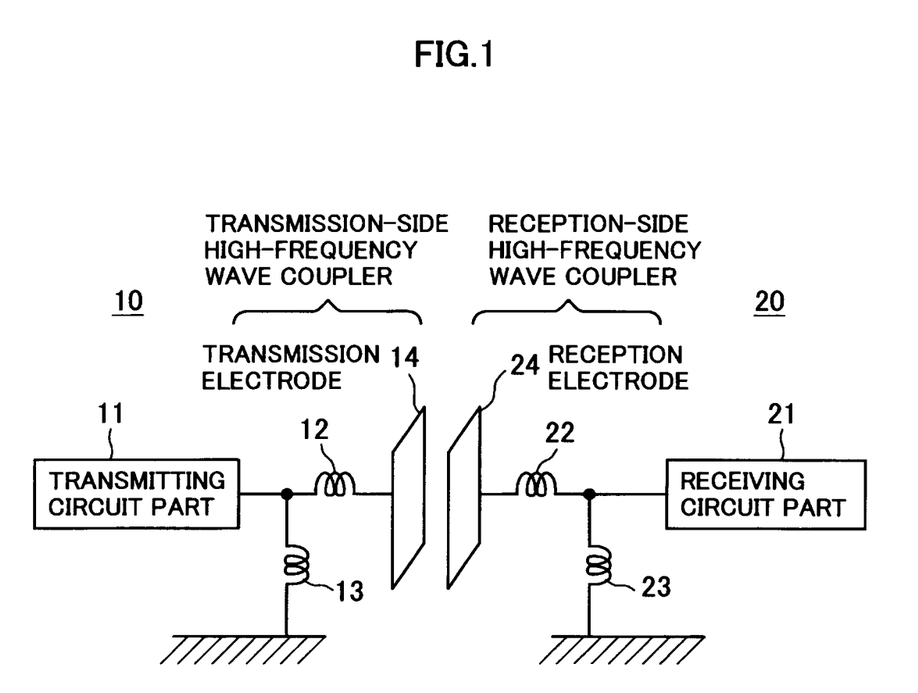
FIG. 1 is an explanatory view of a configuration of a communication system according to an embodiment of the present invention.

First, the configuration of a proximity (non-contact) communication system according to an embodiment of the present invention will be described. FIG. 1 is an explanatory view of the configuration of a communication system according to the present embodiment.

The communication system according to the present embodiment includes a transmitter 10 that transmits data and a receiver 20 that receives the transmitted data. The transmitter 10 has a mount (electric field coupler) including a transmitting circuit part 11, a series inductor 12, a parallel inductor 13, and a flat transmission electrode 14. The receiver 20 has a mount (electric field coupler) including a receiving circuit part 21, a series inductor 22, a parallel inductor 23, and a flat reception electrode 24.

The flat transmission electrode 14 and the flat reception electrode 24 are arranged to face each other at a distance of, for example, about 3 cm so that both electrodes can be coupled by an electric field. When a transmission request arises from an upper-level application, the transmitting circuit part 11 on the transmitter 10 side generates a high-frequency transmission signal, such as a UWB (Ultra Wide Band) signal, based on transmission data. The generated signal propagates from the flat transmission electrode 14 to the flat reception electrode 24. Then, the receiving circuit part 21 on the receiver 20 side performs demodulation and decoding of the received high-frequency signal, and passes the reproduced data to the upper-level application.

Figure 2:
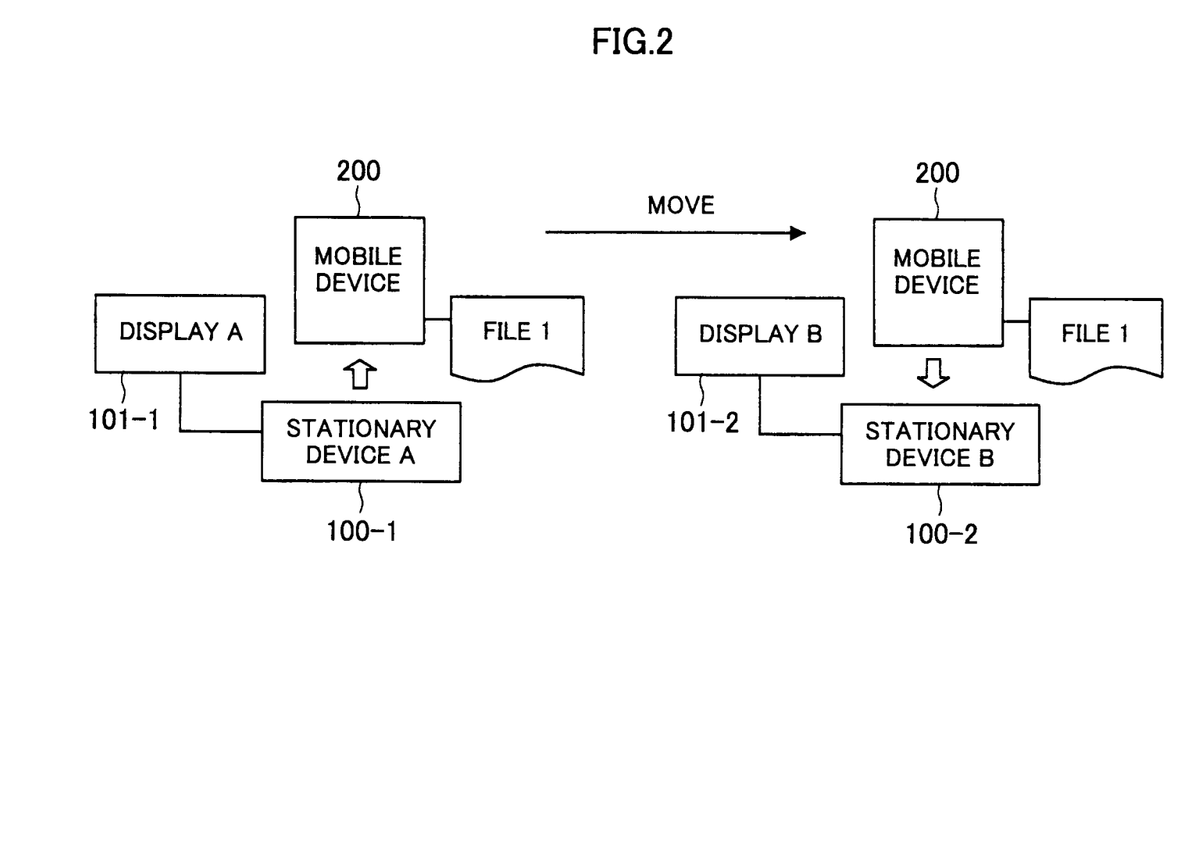
FIG. 2 is an explanatory view showing an application of the communication system according to the embodiment.
Figure 3:
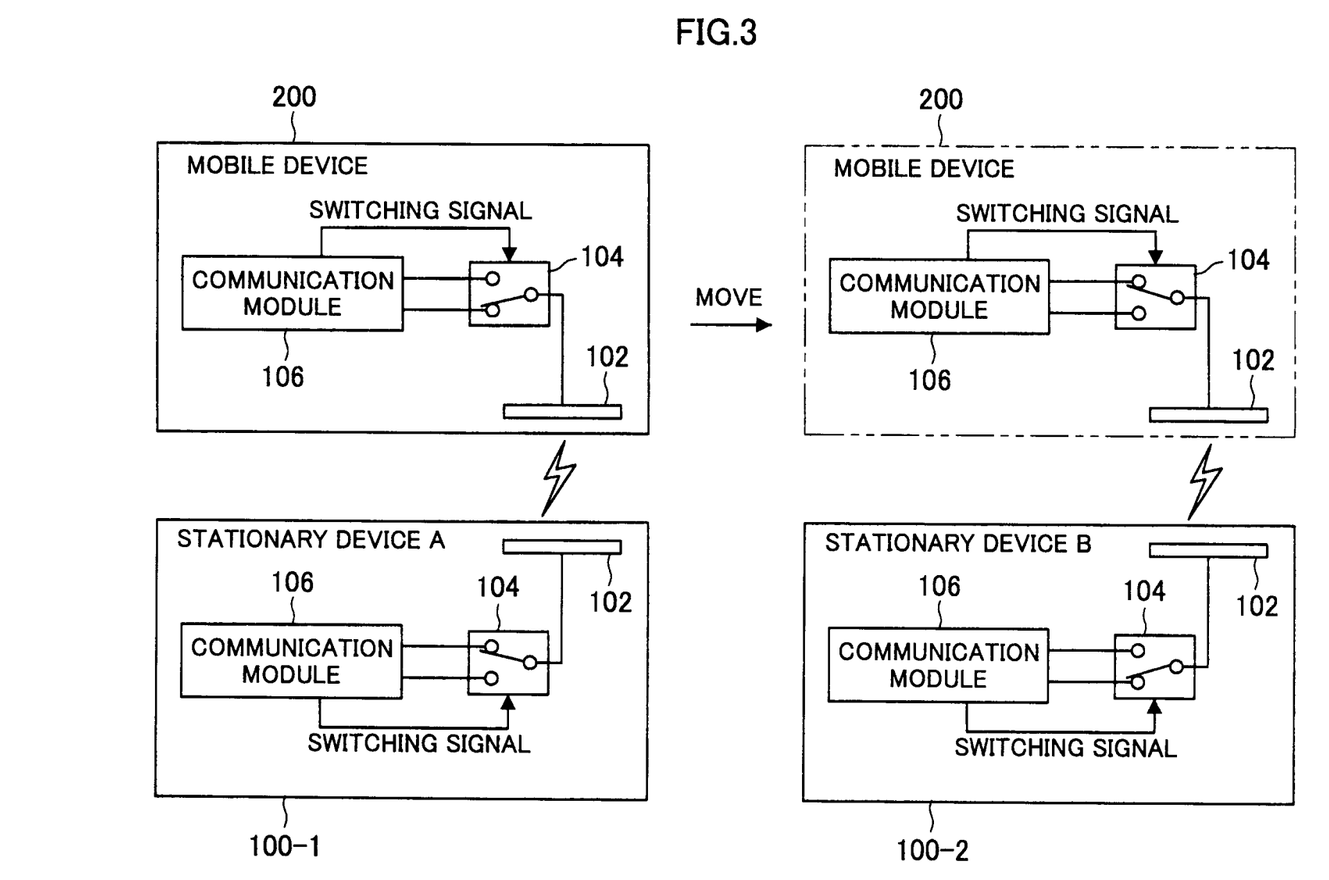
FIG. 3 is a schematic diagram showing the configuration of a stationary device (A), a stationary device (B), and a mobile device according to the embodiment.

Next, an application of a communication system according to an embodiment of the present invention will be described. FIG. 2 is an explanatory view showing an application of the communication system according to the present embodiment. FIG. 3 is a schematic diagram showing the configuration of a stationary device (A) 100-1, a stationary device (B) 100-2, and a mobile device 200 according to the present embodiment.

As shown in FIG. 2 and FIG. 3, the communication system according to the present embodiment includes, for example, the stationary device (A) 100-1, the mobile device 200, the stationary device (B) 100-2 and the like. The stationary device (A) 100-1 (first communication apparatus), the mobile device 200 (second communication apparatus), and the stationary device (B) 100-2 (third communication apparatus) are examples of communication apparatus and have mounts (electric field couplers) that can mutually be coupled by an electric field. The stationary device (A) 100-1 and the stationary device (B) 100-2 may have a display (A) 101-1 and a display (B) 101-2, respectively. The display (A) 101-1 and the display (B) 101-2 may display the file name and content of a data file transmitted and received in the communication system, for example.

The stationary device (A) 100-1 and the stationary device (B) 100-2 are devices that are not assumed to move when used such as a personal computer, a DVD recorder, a videocassette recorder, stereo components, and the like. The mobile device 200 is a device that can easily be carried, such as a mobile phone, a PDA (Personal Digital Assistant), an audio player, a video camera, a game machine, and the like. The mobile device 200 may also be a storage apparatus that can be carried, such as a hard disk drive.

As shown in FIG. 3, the communication functions of the stationary device (A) 100-1, the stationary device (B) 100-2, and the mobile device 200 according to the present embodiment of the present invention are each configured in the same manner. The stationary device (A) 100-1, the stationary device (B) 100-2, and the mobile device 200 each have an electric field coupler (communication part) 102, a selector 104, a communication module 106 and the like.

When the electric field coupler 102 of the mobile device 200 and the electric field coupler 102 of the stationary device (A) 100-1 or the stationary device (B) 100-2 are brought closer to each other at a distance within about 3 cm, for example, a change in an induction field generated by one electric field coupler is sensed by the other electric field coupler 102. As a result, one-to-one electric field communication between the stationary device (A) 100-1 and the mobile device 200 or between the stationary device (B) 100-2 and the mobile device 200 is established.

More specifically, one of a pair of devices that perform the electric field communication functions as an initiator and the other as a responder. The initiator is a connection establishment request side and the responder is a waiting side waiting for a connection establishment request from the initiator.

For example, a case in which the stationary device (A) 100-1 and the mobile device 200 shown in FIG. 2 function as an initiator and as a responder, respectively, will be described. When the stationary device (A) 100-1 and the mobile device 200 are brought closer, a connection establishment request (connection request frame) transmitted from the stationary device (A) 100-1 is received by the mobile device 200. When the connection establishment request is received by the mobile device 200, the mobile device 200 transmits a connection response permission (connection response frame) to the stationary device (A) 100-1. Next, when the stationary device (A) 100-1 receives the connection response permission, a communication connection is established between the mobile device 200 and the stationary device (A) 100-1. Afterwards the connection is established or simultaneously with establishment of the connection, the mobile device 200 and the stationary device (A) 100-1 perform authentication. If the authentication terminates successfully, the mobile device 200 and the stationary device (A) 100-1 enter a state in which data communication can be performed therebetween. The authentication includes validation whether or not software version, data transfer system, protocol of each device and the like match between the mobile device 200 and the stationary device (A) 100-1.

Subsequently, the mobile device 200 and the stationary device (A) 100-1 perform one-to-one data communication. More specifically, the stationary device (A) 100-1 transmits certain data to the mobile device 200 via the electric field coupler 102. Afterwards, the mobile device 200 holds the data file received from the stationary device (A) 100-1. The arbitrary data includes audio data such as music, lectures, and radio programs, video data such as movies, TV programs, video programs, photos, documents, pictures, and diagrams, games, software, and the like.

On the other hand, a case in which the stationary device (A) 100-1 functions as an initiator and the mobile device 200 as a responder is described hereinafter, a case in which the mobile device 200 functions as an initiator and the stationary device (B) as a responder works in the same manner.

While radio waves radiated from an antenna in a radio frequency communication method attenuate inversely proportional to the square of the distance, the intensity of an induction field generated by an electric field coupler in the communication method according to the present embodiment is inversely proportional to the fourth power of the distance. Thus, the distance between a pair of devices capable of performing electric field communication can advantageously be limited. Specifically, according to electric field communication of the present embodiment, the advantageous effects of a small amount of signal deterioration due to obstacles present in the surroundings, being able to simplify technologies against hacking, and being able to ensure confidentiality are achieved.

Radio waves radiated from an antenna have a transverse wave component vibrating in a direction orthogonal to the traveling direction of the radio waves and thus include polarization. In contrast, an electric field coupler has a longitudinal wave component vibrating in the traveling direction and generates an induction field without polarization and thus, a signal can conveniently be received by the receiving side if respective surfaces of a pair of electric field couplers are facing each other.

While the present embodiment describes an example in which short-distance radio communication (non-contact communication, TransferJet (registered trademark)) is performed by using electric field couplers of a pair of communication apparatus, the present embodiment is not limited specifically thereto. For example, the pair of communication apparatus can also perform short-distance radio communication via communication parts capable of communicating via magnetic field coupling. According to the communication method using electric field coupling or magnetic field coupling, no signal is transmitted if a communication partner does not come close, and thus the communication method is more advantageous than the radio frequency communication method in that the issue of interference is less likely to arise.

Figure 4:
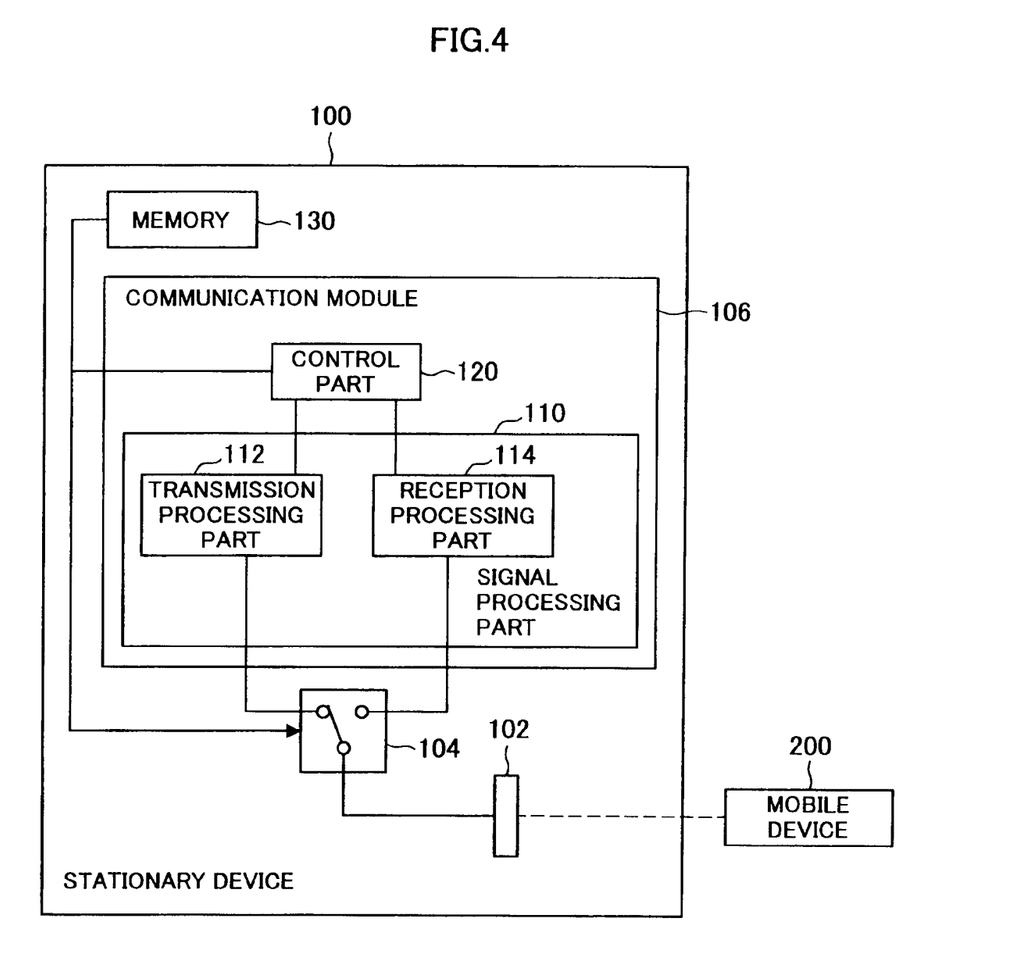
FIG. 4 is a block diagram showing the configuration of the stationary device according to the embodiment.

Next, the configuration concerning the communication function of the stationary device (A) 100-1 and the stationary device (B) 100-2 (hereinafter, also generically referred to as "stationary device 100") will be described with reference to FIG. 4. FIG. 4 is a block diagram showing the configuration of the stationary device 100 according to the present embodiment.

As shown in FIG. 4, the stationary device 100 includes the electric field coupler (communication part) 102, the selector 104, a transmission processing part 112, a reception processing part 114, a control part 120, a memory 130, and the like. The electric field coupler 102 is constituted by the mount shown in FIG. 1 and performs communication with the electric field coupler 102 of the mobile device 200 through electric field coupling. The electric field coupler 102 held by the stationary device 100 and that held by the mobile device 200 are arranged to face each other with a distance of about 3 cm, for example, therebetween so that both electric field couplers are coupled by an electric field. The electric field coupler 102 is selectively connected to one of the transmission processing part 112 and the reception processing part 114 via the selector 104. In the present embodiment, the transmission processing part 112 and the reception processing part 114 constitute a signal processing part 110. The signal processing part 110 and the control part 120 constitute the communication module 106.

The transmission processing part 112 generates a transmission signal to be transmitted from the electric field coupler 102 to the mobile device 200. The transmission processing part 112 includes components such as an encoder for encoding transmission data, a diffuser for diffusing transmission data, a mapper for extending transmission data from binary code to a complex signal, and an RF circuit for performing up conversion to a center frequency.

The reception processing part 114 decodes a received signal received by the electric field coupler 102. The reception processing part 114 includes components such as an RF circuit into which the received signal is input, an AD conversion part for converting the received signal into a digital signal, a demapper for demapping the received signal, and a decoder.

Figure 5:
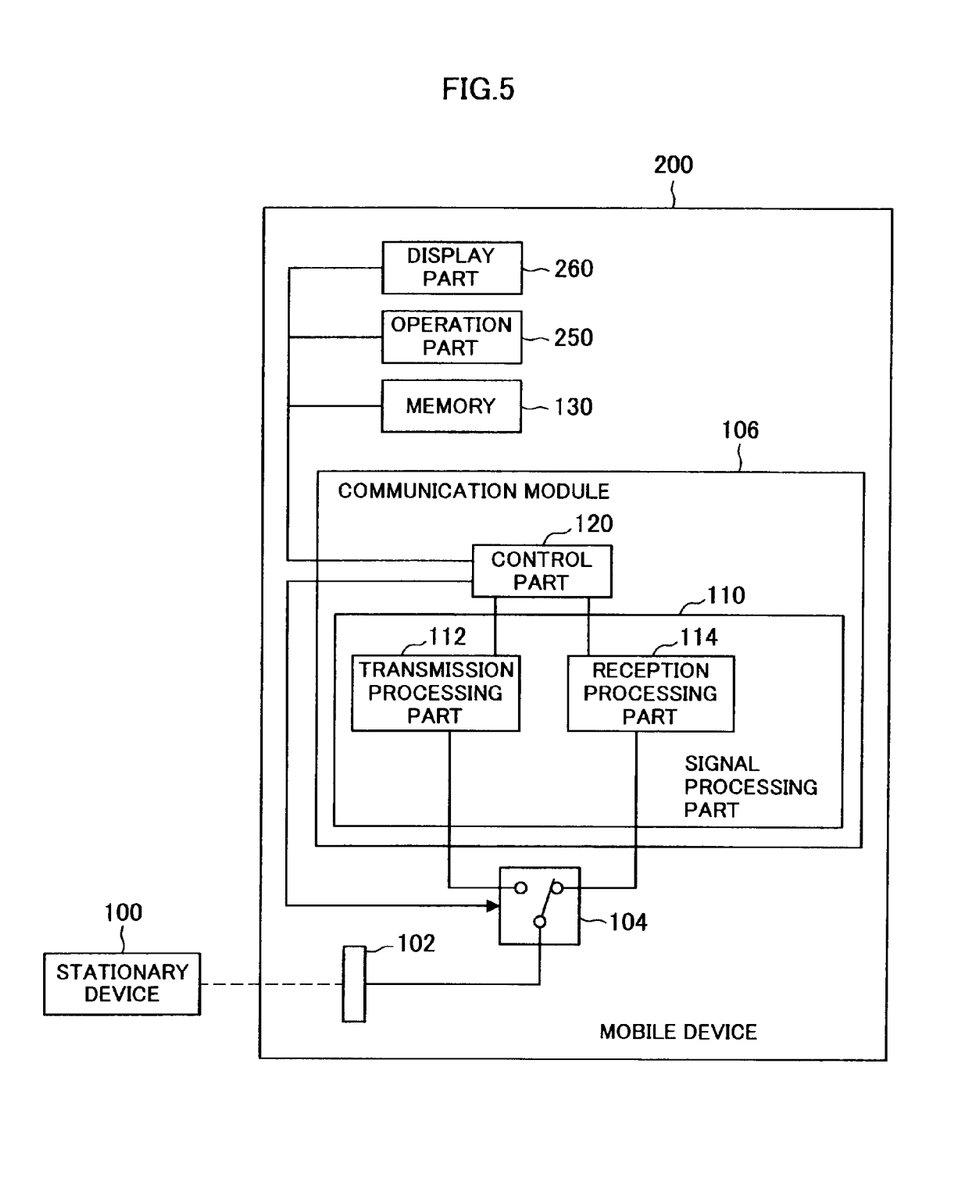
FIG. 5 is a block diagram showing the configuration of the mobile device according to the embodiment.

When a transmission request arises from an upper-level application, the transmission processing part 112 generates a high-frequency transmission signal such as a UWB signal based on transmission data and the signal propagates from the electric field coupler 102 to the mobile device 200. The electric field coupler 102 on the mobile device 200 side performs demodulation and decoding of the received high-frequency signal and passes the reproduced data to the upper-level application. As shown in FIG. 5, similar processing is performed when data is transmitted from the mobile device 200 side to the stationary device 100. FIG. 5 is a block diagram showing the configuration of the mobile device 200 according to the present embodiment. Therefore, bi-directional communication is achieved between the stationary device 100 and the mobile device 200.

According to a communication method using a high frequency and wide bandwidth like UWB communication, ultra high-speed data transmission of about several hundred Mbps can be realized in a short distance. When UWB communication is performed via electric field coupling, instead of radio frequency communication, the electric field intensity is inversely proportional to the fourth power of distance. Therefore, radio waves can be extremely low power radio waves for which a radio station license is unnecessary by suppressing the electric field intensity (intensity of radio waves) in a distance of 3 m from a radio equipment to a predetermined level or less, and the communication system can be constructed at a low cost. When data communication is performed by the electric field coupling method in an extremely short distance, signal quality does not deteriorate due to reflective objects present in the surroundings, hacking into a transmission path can reliably be prevented, and thus confidentiality can be ensured. Moreover, a configuration in which two devices may not be able to simultaneously perform communication with one device can be created by suppressing the electric field intensity to a predetermined level or less to enable communication only within a distance of 3 cm, for example, so that one-to-one, short distance communication can be achieved.

The control part 120 controls overall operations of the stationary device 100. For example, the control part 120 controls generation of a transmission signal by the transmission processing part 112 and decoding of a received signal by the reception processing part 114. The control part 120 also outputs a switching signal to the selector 104 to cause the selector 104 to connect the electric field coupler 102 and the transmission processing part 112 when a connection request frame, data file, or the like, is transmitted to the mobile device 200. The control part 120 also outputs a switching signal to the selector 104 to cause the selector 104 to connect the electric field coupler 102 and the reception processing part 114 when a connection request frame, data file, or the like, from the mobile device 200 being received. The control part is an example of the transmission control part.

A connection is established when a connection request frame C-Req is transmitted from one device (initiator) to the other device (responder) and a connection response frame C-Acc transmitted from the responder is received by the initiator. The connection request frame is transmitted to the communication partner by a device to which a user action, for example, a data file transfer, data file selection, or the like, is input. After a connection is established between the stationary device 100 and the mobile device 200 in the system according to the present embodiment, neither the stationary device 100 nor the mobile device 200 establishes any connection with another device. Therefore, one-to-one communication is performed between the stationary device 100 and the mobile device 200.

The control part 120 of the mobile device 200 is an example of a relay transfer mode setting part and sets the relay transfer mode for relay transfer of a data file from one or more devices to another at least one device. The control part 120 of the mobile device 200 is also an example of an input part and, for example, a release instruction of the relay transfer mode from an operation part 250 is input. In this case, the control part 120 releases the relay transfer mode when the release instruction is input. The control part 120 of the mobile device 200 is an example of a time counter and determines whether a timeout has occurred. In this case, the control part 120 releases the relay transfer mode when a timeout occurs. The relay transfer mode will be described hereinafter.

The memory 130 is a recording medium such as a hard disk drive and flash memory. The memory 130 holds a received data file. Functional blocks shown in FIG. 4 and FIG. 5 can be configured by hardware (circuit) or a processing part (CPU) and software (program) that causes the hardware or the processing part to function. When these functional blocks are configured by a processing part and software, a program thereof can be stored in a recording medium such as the memory 130 provided in the stationary device 100 and the mobile device 200.

As shown in FIG. 5, in addition to the blocks corresponding to those of the stationary device 100 shown in FIG. 4, the mobile device 200 may further include the operation part 250 and a display part 260. The operation part 250 is a user interface that accepts a user operation and sends a signal in accordance with the operation to the control part 120. The display part 260 is a display device capable of displaying operation content, data file content, and the like. The display part 260 is controlled by a display processing part. The display part 260 displays a setting or release of the relay transfer mode.

Next, the relay transfer mode according to the present embodiment will be described.

The relay transfer mode is a function of the mobile device 200. The relay transfer mode is used by the mobile device 200, when a data file is transferred from the stationary device (A) 100-1 to the stationary device (B) 100-2, to temporarily hold the data file. As the data file transferred here, a data file group consisting of a plurality of data files as well as a single data file can be assumed. The relay transfer mode can be used when mutual proximity of devices necessary for the proximity communication method of the present embodiment is difficult to achieve, for example, for a stationary device that is difficult to move.

When the mobile device is used for relay transfer of a data file as described above, an operation to select a data file to be relay-transferred via the operation part and the display part of the mobile device is usually necessary. Then, the mobile device can transmit the data file selected by the selection operation to the other stationary device. However, in the mobile device, a data file that has just been acquired may clearly be specified. Thus, if a file selection operation for each relay transfer has to be performed, the user is required to perform a complicated procedure.

Thus, in the mobile device 200 according to the present embodiment, if a data file is received from one or more stationary devices (A) 100-1 while the relay transfer mode is set, the data file is held in the memory 130 as a file to be relay-transferred. Then, while the relay transfer mode is set, the data file held in the memory 130 is transmitted to another at least one stationary device (B) 100-2. Therefore, according to the present embodiment, a troublesome operation of file selection operation for relay transfer is made unnecessary in the mobile device 200 so that a data file can be relay-transferred swiftly and simply.

Figure 6:
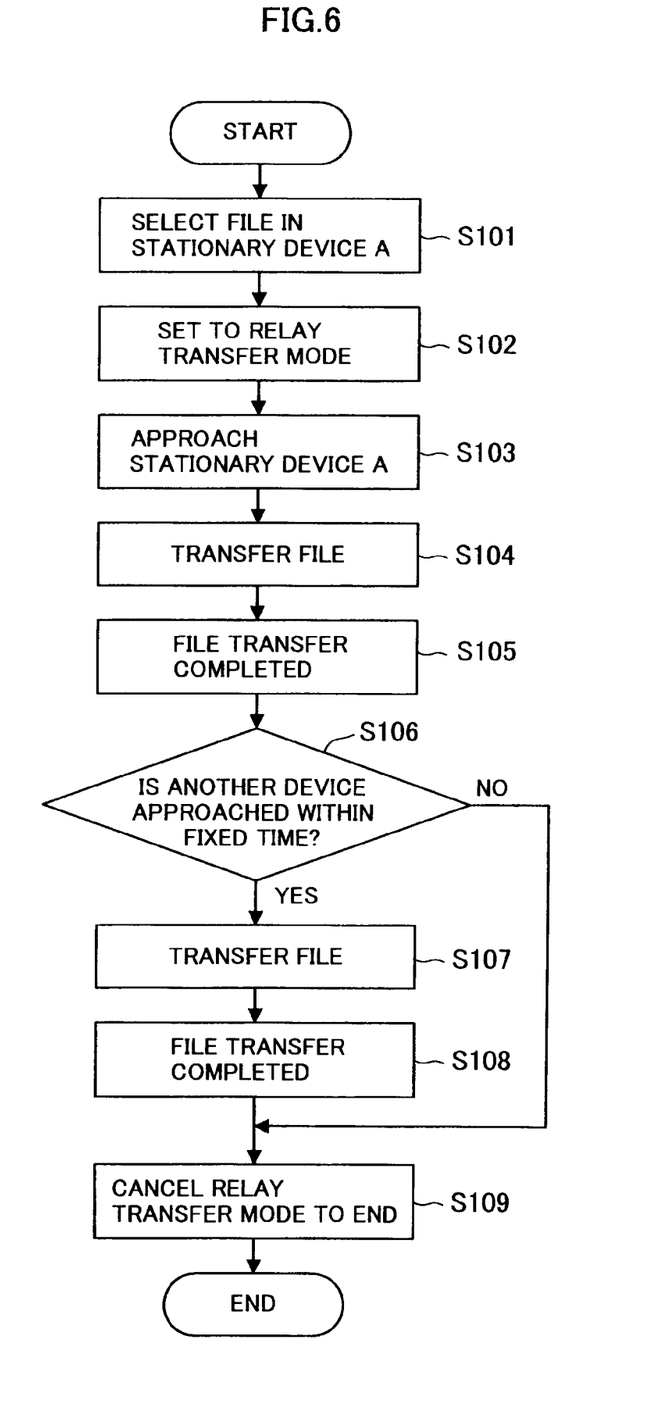
FIG. 6 is a flow chart showing an operation of the communication system according to the embodiment.

The relay transfer mode in the communication system according to the present embodiment will be described in detail with reference to FIG. 6. The communication system includes, as shown in FIG. 2, the stationary device (A) 100-1, which is a transmission source, the mobile device 200 having a relay transfer function, and the stationary device (B) 100-2, which is a transmission destination. FIG. 6 is a flow chart showing an operation of the communication system according to the present embodiment.

First, a data file to be transmitted to the stationary device (B) 100-2 via the mobile device 200 is selected in the stationary device (A) 100-1 (step S101). The selected data file may be a data file or a plurality of data files. Next, the mobile device 200 is put into relay transfer mode (step S102). For example, the button to set the relay transfer mode in the operation part 250 is pressed by the user and the mobile device 200 is put into relay transfer mode based on the operation.

Then, while the mobile device 200 is set in relay transfer mode, the mobile device 200 is brought closer to the stationary device (A) 100-1 (step S103). When communication is established between the stationary device (A) 100-1 and the mobile device 200 while the relay transfer mode is set, the data file selected in the stationary device (A) 100-1 is transferred from the stationary device (A) 100-1 to the mobile device 200 (step S104). When the selected data files are all transferred to the mobile device 200, data file transfer is completed (step S105). The mobile device 200 holds the received data file in the memory 130.

The mobile device 200 has a time counter to determine, for example, whether or not a timeout has occurred. While the mobile device 200 is set in relay transfer mode, the time counter measures, for example, the time elapsed after the file transfer at step S105 is completed and issues a timeout when a fixed amount of time has passed. The time counter also measures, for example, the time elapsed after the relay transfer mode is set and issues a timeout when a fixed amount of time has passed. The time to issue a timeout can be set to any time by the user in advance.

While the relay transfer mode is set, the mobile device 200 determines whether communication is established by approaching the other stationary device (B) 100-2 within a fixed amount of time before a timeout occurs (step S106). If communication is established with the stationary device (B) 100-2 within a fixed amount of time, the mobile device 200 transfers the data file received from the stationary device (A) 100-1 while the relay transfer mode is set to the stationary device (B) 100-2 (step S107). At this point, there is no need for the user to select a data file in the mobile device 200. Therefore, since the user is not required to perform a complicated procedure, a data file can be transferred swiftly and simply. When all the data files received and held is completely transferred to the stationary device (B) 100-2 while the relay transfer mode is set, data file transfer is complete (step S108). Then, the relay transfer mode set in the mobile device 200 is released (step S109). When the relay transfer mode is released, the mobile device 200 may delete the data file received while the relay transfer mode is set.

On the other hand, if communication is not established with the stationary device (B) 100-2 within a fixed amount of time and a timeout occurs, the relay transfer mode set for the mobile device 200 is released before transferring the data file (step S109). When the relay transfer mode is released due to an occurrence of timeout, the relay transfer can be determined to be no longer necessary. Thus, the mobile device 200 can delete the data file and there is no need to permanently store a data file therein.

In the foregoing description, although the release of the relay transfer mode is determined depending on whether the mobile device 200 is close to the stationary device (B) 100-2 within a fixed amount of time, the present invention is not specifically limited thereto. For example, the release of the relay transfer mode may be determined by a user operation. More specifically, the file transfer may be achieved by a drag-and-drop operation like a mouse operation in a personal computer. First, a data file is transferred from the stationary device (A) 100-1 to the mobile device 200 when communication therebetween is established by bringing the mobile device 200 closer to the stationary device (A) 100-1 while the button (relay transfer mode setting button) provided in the mobile device 200 being pressed. Then, the relay transfer mode is continued while the relay transfer mode setting button is pressed. After the file transfer is completed, the data file is then transferred from the mobile device 200 to the stationary device (B) 100-2 when communication therebetween is established by bringing the mobile device 200 closer to the stationary device (B) 100-2. While communication is established, the pressing of the relay transfer mode setting button may be stopped.

In this manner, by pressing or releasing the button, an instruction is input from the operation part 250 to the control part 120 to set or release the relay transfer mode of the mobile device 200. As a result, the relay transfer mode can be released without using the time counter.

In the foregoing description, although the relay transfer mode continues while the button continues to be pressed like a drag-and-drop operation, the relay transfer mode may be set and released by other type of button operations. For example, the relay transfer mode may be started when the button is pressed and released once and terminated when the button is pressed and released once again.

Although the file transfer in relay transfer mode described using FIG. 2 and FIG. 6 is a transfer of a data file from one stationary device (A) 100-1 to one stationary device (B) 100-2, the present invention is not limited to such an example. For example, there may be a plurality of the stationary devices (A) 100-1 as transmission sources or a plurality of the stationary devices (B) 100-2 as transmission destinations.

More specifically, if there is a plurality of the stationary devices (A) 100-1 as transmission sources, the mobile device 200 needs to know an end of data file reception. For example, the mobile device 200 accepts data files until the end of data file reception is input via the operation of a user's button in the operation part 250. Then, after the end of data file reception is input, the mobile device 200 transmits the data file to the other stationary device (B) 100-2 with which communication is established.

If, on the other hand, there is a plurality of the stationary devices (B) 100-2 as transmission destinations, the mobile device 200 may be allowed to transfer a data file to the plurality of the stationary devices (B) 100-2 while the relay transfer mode is set, instead of automatically releasing the relay transfer mode after transmitting the data file to one stationary device (B) 100-2. The relay transfer may end when the relay transfer mode is released by an initiation of timeout or a user operation.

Figure 7:
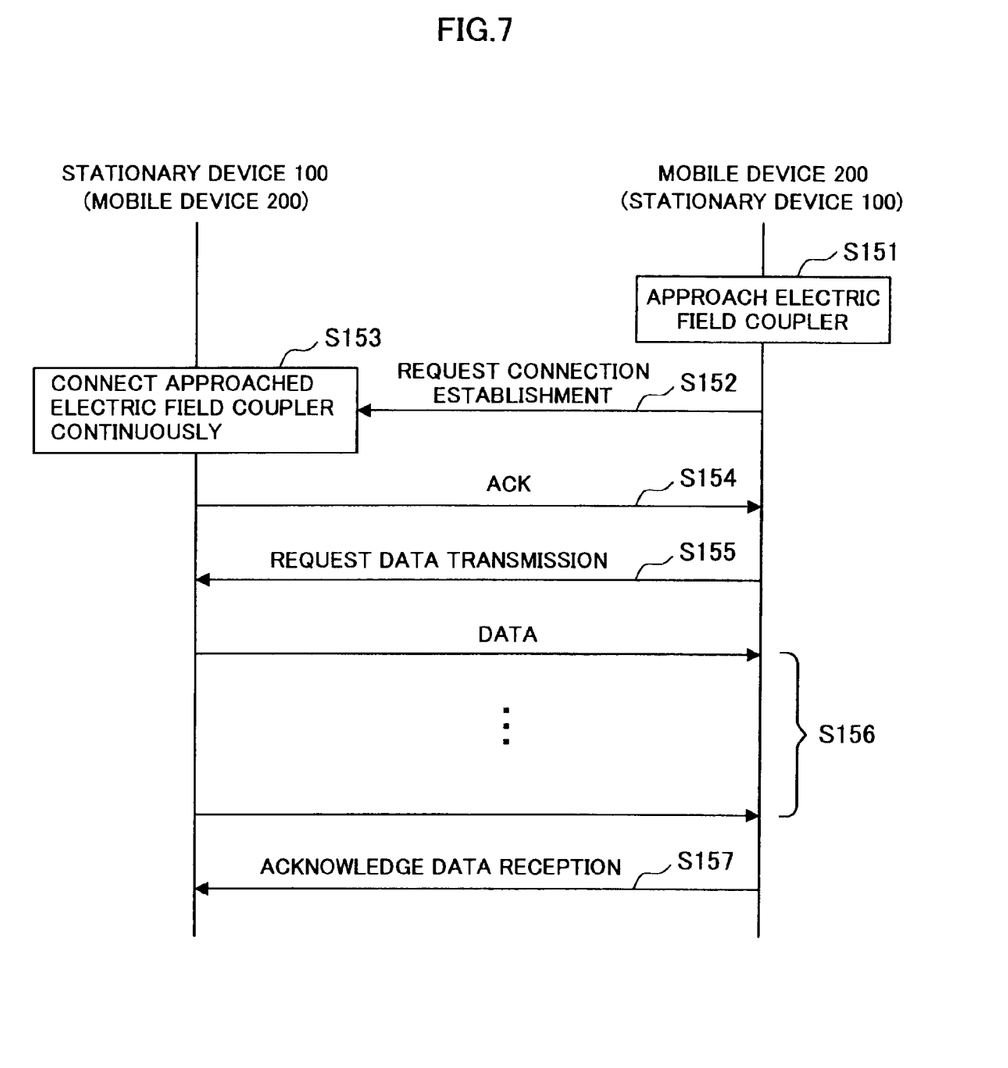
FIG. 7 is a sequence diagram showing a flow of a communication establishment operation between the stationary device and the mobile device according to the embodiment.

Next, the flow of communication establishment between the stationary device 100 and the mobile device 200 and data transmission/reception operations will be described with reference to FIG. 7. FIG. 7 is a sequence diagram showing the flow of a communication establishment operation between the stationary device 100 and the mobile device 200.

As shown in FIG. 6, it is assumed that the mobile device 200 is brought closer to the electric field coupler 102 of the stationary device 100 while the electric field coupler 102 connected to the signal processing part 110 of the stationary device 100 is periodically switched by the selector 104 (S151). In this case, a connection establishment request transmitted from the mobile device 200 is received by the electric field coupler 102 of the stationary device 100 (S152).

Then, the stationary device 100 receives the connection establishment request from the mobile device 200, and subsequently the control part 120 performs control, so that the electric field coupler 102 is continuously connected to the signal processing part 110 (S153). Next, an ACK generated by the signal processing part 110 is transmitted from the electric field coupler 102 and, when the ACK is received by the mobile device 200, the stationary device 100 and the mobile device 200 are connected in such a state that data communication is possible (S154).

Afterwards, when a data transmission request is transmitted from the mobile device 200 to the electric field coupler 102 (S155), the control part 120 causes the signal processing part 110 to generate a transmission signal of a data file. Then, the electric field coupler 102 transmits the transmission signal generated by the signal processing part 110 to the mobile device 200 (S156).

When further data reception acknowledgment is received by the electric field coupler 102, the control part 120 of the stationary device 100 determines that communication with the mobile device 200 has ended and causes the selector 104 to periodically switch the connection destination of the signal processing part 110 again (S157).

Communication is established and a data transmission/reception operation is performed between the stationary device 100 and the mobile device 200 as described above. In the foregoing description, although the mobile device 200 is the initiator and makes a connection establishment request and the stationary device 100 is the responder and waits for the connection establishment request, the stationary device 100 may conversely be the initiator and the mobile device 200 the responder.

Next, a case in which a plurality of data files is transmitted/received in relay transfer mode will be described in detail with reference to FIG. 8 and FIG. 9. When a plurality of data files is transmitted/received by an operation described later, the apparatus on the receiving side is able to clearly determine when reception of the files is completed. As a result, not only relay transfer of one data file be carried out, but also transfer of a plurality of data files can easily be carried out.

Figure 8:
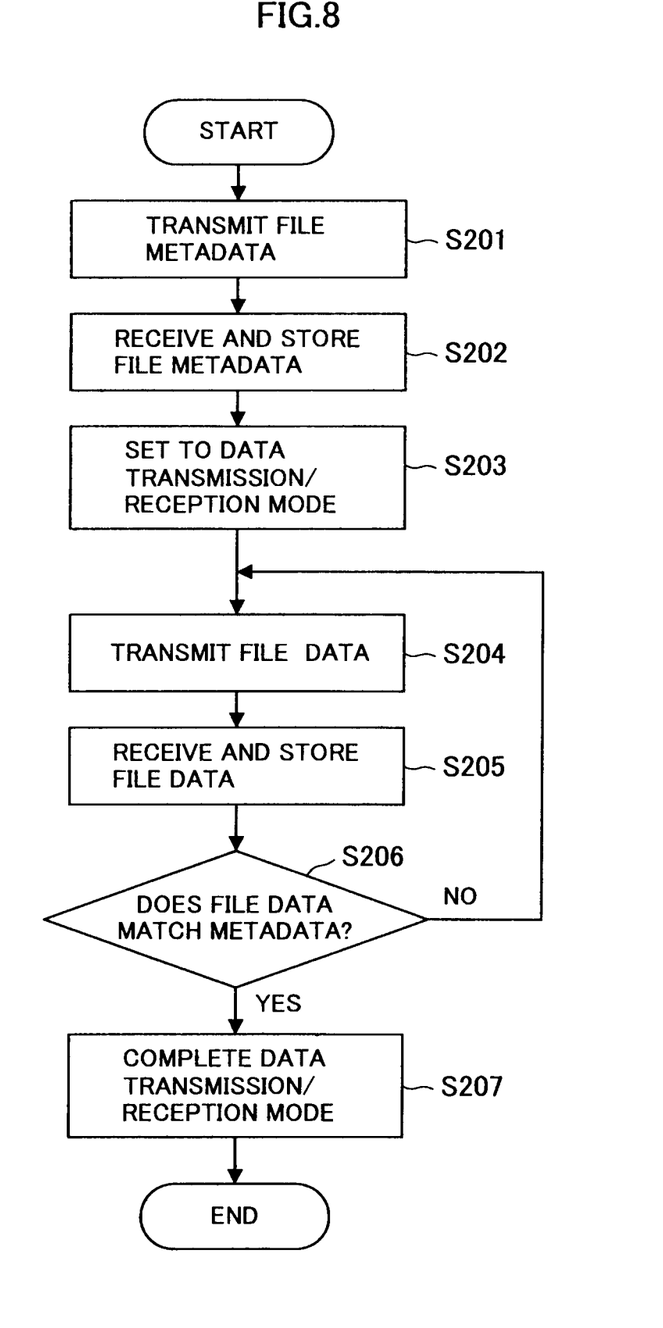
FIG. 8 is a flow chart showing a transmission/reception operation of a data file between the stationary device and the mobile device according to the embodiment.
Figure 9:
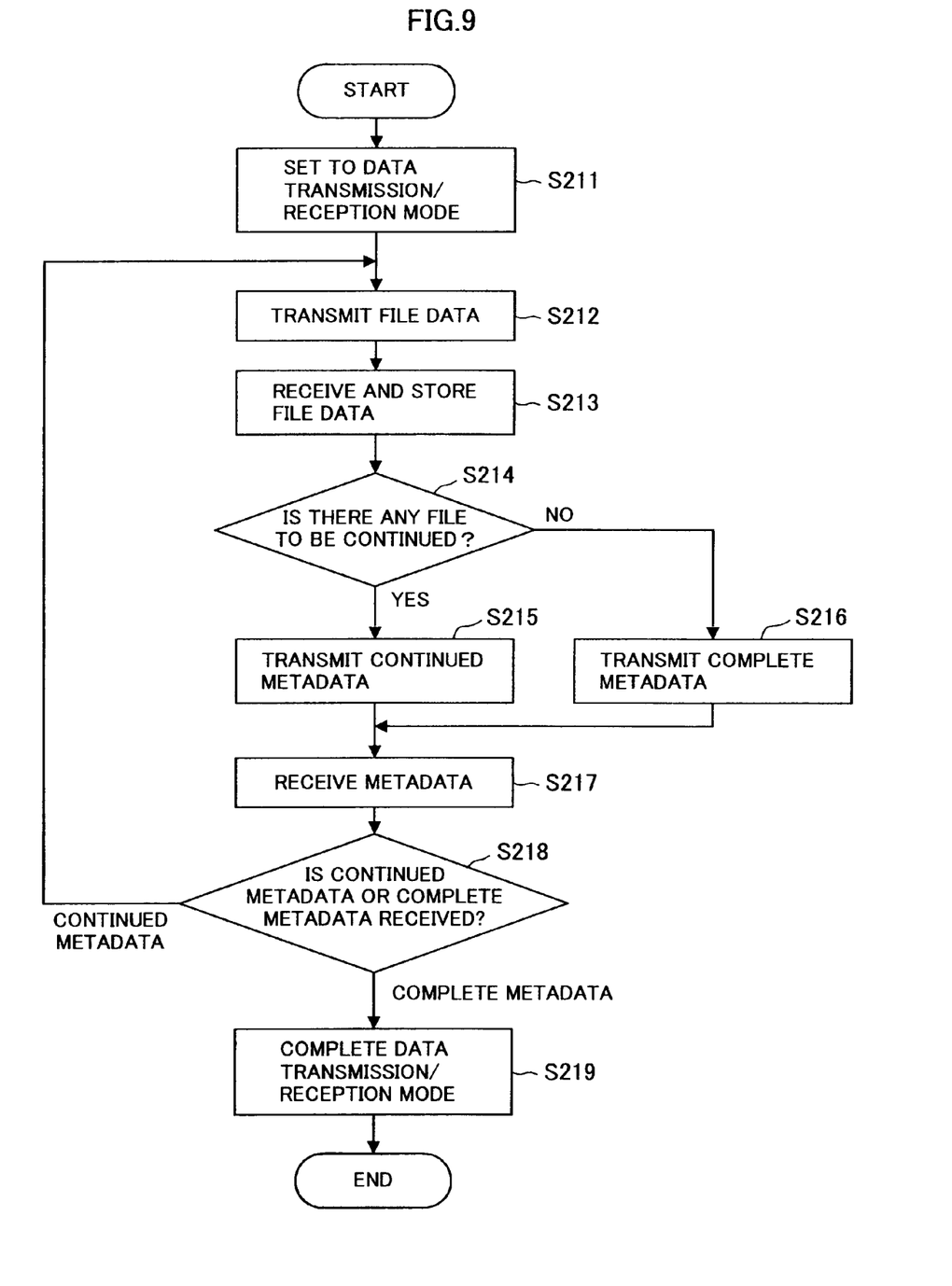
FIG. 9 is a flow chart showing the transmission/reception operation of the data file between the stationary device and the mobile device according to the embodiment.

FIG. 8 and FIG. 9 are flow charts showing the transmission/reception operation of data files between the stationary device 100 and the mobile device 200 according to the present embodiment. Although a case in which a plurality of data files is transferred from the stationary device (A) 100-1 to the mobile device 200 will be described below, a case in which a plurality of data files is transferred from the mobile device 200 to the stationary device (A) 100-1 is similar thereto.

In the example shown in FIG. 8, file metadata summarizing a plurality of data files to be transmitted is generated in advance in the stationary device (A) 100-1 on the transmitting side. For example, the metadata includes data on file names and the number of data files to be transmitted.

First, the stationary device (A) 100-1 transmits file metadata to the mobile device 200 (step S201). Then, the mobile device 200 in the receiving side receives the file metadata and stores the file metadata in the memory 130 (step S202), for example. Next, the stationary device (A) 100-1 and the mobile device 200 are put into a mode (data transmission/reception mode) in which file data can be transmitted/received (step S203).

The stationary device (A) 100-1 continuously transmits file data to the mobile device 200 in the data transmission/reception mode (step S204). Then, the mobile device 200 on the receiving side receives the file data and stores the file data in the memory 130 (step S205), for example. The mobile device 200 checks whether file names or the number of the received file data and file names or the number of files recorded in the file metadata received in advance match (step S206). The mobile device 200 continues to receive file data until matching with the file metadata is confirmed. Then, when the mobile device 200 can determine that matching with the file metadata is confirmed and transmission/reception of all data files has been completed, the mobile device 200 terminates the data transmission/reception mode (step S207).

Thus, in the example shown in FIG. 8, a plurality of data files can reliably be transmitted/received by using file metadata.

In the example shown in FIG. 9, information about whether there is any data file to be subsequently transmitted is transmitted along with a portion piece of the file data by the stationary device (A) 100-1 on the transmitting side.

First, the stationary device (A) 100-1 and the mobile device 200 are put into a mode (data transmission/reception mode) in which file data can be transmitted/received (step S211). The stationary device (A) 100-1 transmits one piece of file data to the mobile device 200 in the data transmission/reception mode (step S212). Then, the mobile device 200 on the receiving side receives the file data and stored the file data, for example, in the memory 130 (step S213).

Next, whether there is any data file to be continued is determined because the stationary device (A) 100-1 transmits a plurality of data files (step S214). If there is any data file to be continued, the stationary device (A) 100-1 transmits metadata indicating that there is a data file to be continued to the mobile device 200 (step S215). On the other hand, if there is no data file to be continued, the stationary device (A) 100-1 transmits metadata indicating that data file transmission has been completed to the mobile device 200 (step S216).

Then, the mobile device 200 receives continuation metadata or completion metadata (step S217). If the stationary device (A) 100-1 transmits continuation metadata and the mobile device 200 receives the continuation metadata (step S218), the data transmission/reception mode is continued and the next one piece of data file is further transmitted/received (step S212, step S213). Then, metadata is transmitted/received in the same manner as described above (step S214 to step S217).

On the other hand, if the stationary device (A) 100-1 transmits completion metadata and the mobile device 200 receives the completion metadata (step S218), the data transmission/reception mode is completed (step S219).

In the example shown in FIG. 9, a plurality of data files described above can reliably be transmitted/received by also transmitting/receiving metadata for each data file. However, transmission/reception operations of a plurality of data files are not limited to the examples shown in FIG. 8 and FIG. 9. For example, the file name of a data file being transmitted/received may be displayed in the display part 260 of the mobile device 200 to allow the user to confirm transmission/reception. In this case, the stationary device 100 and the mobile device 200 need not receive information about when transmission/reception of a plurality of data files is completed because the user determines when to connect or disconnect the devices.

According to the present embodiment described above, the user need not select a file to be relay-transferred in the mobile device 200 by the relay transfer mode being set in the mobile device 200. More specifically, in relay transfer in related art, as shown at step S15 in FIG. 10, a file selection is considered to be necessary in a mobile device.

Figure 10:
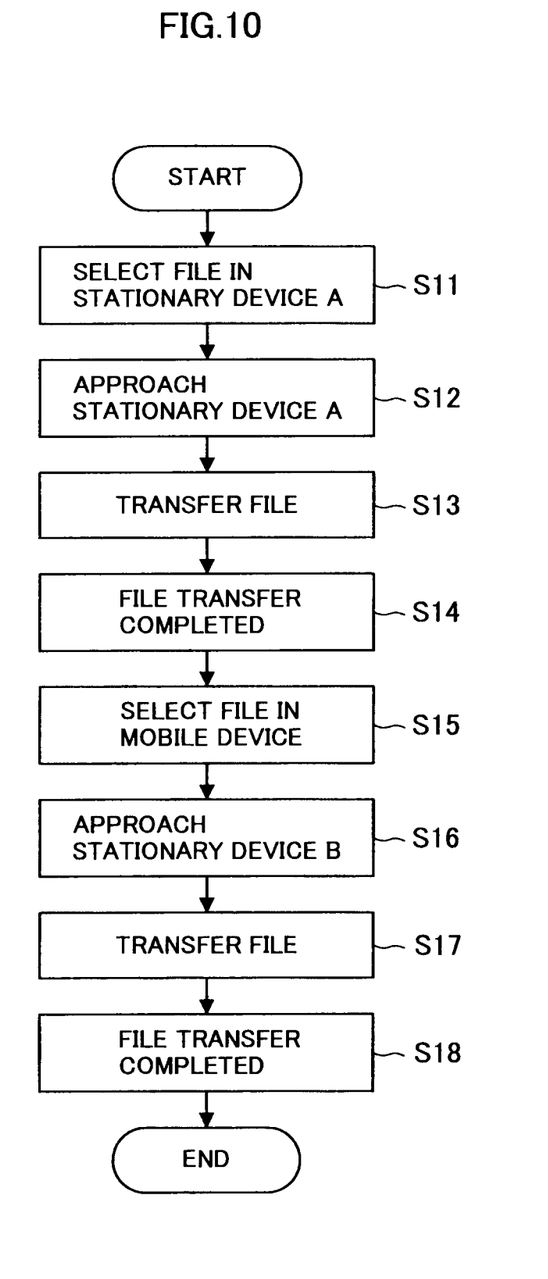
FIG. 10 is a flow chart showing the operation of a communication system in related art.

FIG. 10 is a flow chart showing the operation of a communication system of related art. First, data files to be transmitted to a stationary device (B) via a mobile device are selected in a stationary device (A) (step S11). Next, the mobile device is brought closer to the stationary device (A) (step S12). When communication between the stationary device (A) and the mobile device is established, the data files selected in the stationary device (A) are transferred from the stationary device (A) to the mobile device (step S13). When the selected data files are all transferred to the mobile device, the transfer of data files is completed (step S14). The mobile device holds the received data files in a memory.

Next, data files to be transmitted to the stationary device (B) are selected in the mobile device (step S15). In contrast to the present embodiment, this step may be a complicated operation for the user because this step is also required even in a case in which data files that have just been received from the stationary device (A) are to be transmitted without any change.

Thereafter, the mobile device is brought closer to the other stationary device (B) to establish communication (step S16). The mobile device transfers data files selected at step S14 to the stationary device (B) (step S17). When all the selected data files are transferred to the stationary device (B), the transfer of data files is completed (step S18).

In contrast, according to the present embodiment, there is no need to perform such selection of a file to be relay-transferred in a mobile device as shown at step S15 in FIG. 10. As a result, when data files are relay-transferred using the mobile device 200, a troublesome operation of file selection operation is made unnecessary in the mobile device 200 and thus, data files can be relay-transferred swiftly and simply.

According to the short-distance, one-to-one communication used in the present embodiment, connection between devices is easy. Further, different types of devices can be identified by the communication system, and thus procedures before communication being established can be simplified. Therefore, when connection between a storage device (a flash memory, hard disk, and the like) using a USB terminal, or the like, of related art and a stationary device is compared to connection between the mobile device 200 and the stationary device 100 in the present embodiment, the present embodiment provides easier transmission/reception of data files. Specifically, when a storage device using a USB terminal, or the like, of related art is used, a user operation to select a data file to be transmitted/received is necessary in both of a stationary device as a transmission source and a stationary device as a transmission destination. Whereas, according to the present embodiment, data files can be transmitted/received immediately after communication being established and thus, when compared with relay transfer of data files using a storage device of related art, transmission/reception of data files becomes more swift and simpler.

The present application contains subject matter related to that disclosed in Japanese Priority Patent Application JP 2008-135971 filed in the Japan Patent Office on May 23, 2008, the entire content of which is hereby incorporated by reference.

It should be understood by those skilled in the art that various modifications, combinations, sub-combinations and alterations may occur depending on design requirements and other factors insofar as they are within the scope of the appended claims or the equivalents thereof.

For example, although a case in which at least one apparatus as transmission destinations that receives data files is the stationary device (B) 100-2 is described, the present invention is not limited to such an example. For example, at least one apparatus as transmission destinations may be a mobile device 200-2. The mobile device 200-2 as a transmission destination may also receive data while being set in relay transfer mode. Accordingly, the mobile device 200-2 can further relay-transfer data files to another at least one apparatus swiftly and simply. If, for example, the mobile device 200-2 receives data files from a plurality of devices while the relay transfer mode is set, a distinctive effect of being able to put together a plurality of data files in the mobile device 200-2 and transmitting the plurality of data files to other devices is achieved.

What is claimed is:

1. A communication apparatus, comprising:
a communication part that performs short-distance one-to-one communication with a communication partner apparatus including at least one of a first apparatus or a second apparatus via electric field coupling or magnetic field coupling,
the communication part establishing communication between the communication apparatus and the first apparatus or the second apparatus while the communication apparatus is brought in close alignment with the first apparatus or the second apparatus by a user;
an operation part that accepts a user operation by the user to set or release a relay transfer mode for the communication apparatus;
a relay transfer mode setting part that sets the communication apparatus into a relay transfer mode based on the user operation of the operation part;
a reception processing part that
receives file metadata transmitted from the first apparatus, the file metadata including data indicating file names and total number of data files to be transmitted from the first apparatus to the communication apparatus;
receives data files from the first apparatus after the communication part has established communication between the communication apparatus and the first apparatus, and while the relay transfer mode is set; and
while the relay transfer mode is set, determines whether file transmission from the first apparatus has completed by determining whether a total number of data files received match the data included in the file metadata;
a storage part that holds the data files received from the first apparatus while the relay transfer mode is set; and
a transmission control part that automatically transmits, if communication is established with the second apparatus, the data files held in the storage part to the second apparatus while the relay transfer mode is set and while the communication apparatus is brought in close alignment with the second apparatus by the user, without requiring the user to select via the operation part which data file to transmit.

2. The communication apparatus according to claim 1, wherein the relay transfer mode setting part releases the relay transfer mode when the user operates the operation part to release the relay transfer mode.

3. The communication apparatus according to claim 1, wherein the transmission control part transmits the data files to the second apparatus with which communication is established after the reception processing part determines that the transmission from the first apparatus has completed.

4. The communication apparatus according to claim 1, further comprising a display processing part for displaying a setting or release of the relay transfer mode.

5. A communication system, comprising:
a first communication apparatus that communicates with a second communication apparatus using short-distance one-to-one communication via electric field coupling or magnetic field coupling;
the second communication apparatus comprising:
a communication part that communicates with the first communication apparatus or a third communication apparatus using the short-distance one-to-one communication via electric field coupling or magnetic field coupling, the communication part establishing communication between the second communication apparatus and the first communication apparatus or the third communication apparatus while the second communication apparatus is brought in close alignment with the first communication apparatus or the third communication apparatus by a user;

an operation part that accepts a user operation by the user to set or release a relay transfer mode for the communication apparatus;

a relay transfer mode setting part that sets the communication apparatus into a relay transfer mode based on the user operation of the operation part;

a reception processing part that
receives file metadata transmitted from the first communication apparatus, the file metadata including data indicating file names and total number of data files to be transmitted from the first communication apparatus to the second communication apparatus;
receives data files from the first communication apparatus after the communication part has established communication between the second communication apparatus and the first communication apparatus, and while the relay transfer mode is set; and
while the relay transfer mode is set, determines whether file transmission from the first communication apparatus has completed by determining whether a total number of data files received match the data included in the file metadata;

a storage part that holds the data files received from the first communication apparatus while the relay transfer mode is set; and a transmission control part that automatically transmits, if communication is established with the third communication apparatus, the data files held by the storage part to the third communication apparatus while the relay transfer mode is set and while the second communication apparatus is brought in close alignment with the third communication apparatus by the user, without requiring the user to select via the operation part which data file to transmit; and the third communication apparatus that is different from the first communication apparatus and that performs communication with the second communication apparatus using the short-distance one-to-one communication via electric field coupling or magnetic field coupling.

6. A communication method, comprising the steps of:

performing, by a communication part of a communication apparatus, short-distance one-to-one communication with a communication partner apparatus including at least one of a first apparatus or a second apparatus via electric field coupling or magnetic field coupling,
the communication part establishing communication between the communication apparatus and the first apparatus or the second apparatus while the communication apparatus is brought in close alignment with the first apparatus or the second apparatus by a user;

receiving, by an operation part of the communication apparatus, a user operation by the user to set or release a relay transfer mode;

setting, by a relay transfer mode setting part of the communication apparatus, a relay transfer mode based on the user operation;

receiving, by a reception processing part of the communication apparatus, file metadata transmitted from the first apparatus, the file metadata including data indicating file names and total number of data files to be transmitted from the first apparatus to the communication apparatus;

receiving, by the reception processing part of the communication apparatus, data files from the first apparatus after the communication part has established communication between the communication apparatus and the first apparatus, and while the relay transfer mode is set;

determining, by the reception processing part of the communication apparatus, while the relay transfer mode is set, whether file transmission from the first apparatus has completed by determining whether a total number of data files received match the data included in the file metadata;

holding, by a storage part of the communication apparatus, the data files received from the first apparatus in a storage part while the relay transfer mode is set;

transmitting, automatically by a transmission control part of the communication apparatus, if communication is established with the second apparatus, the data files held in the storage part to the second apparatus while the relay transfer mode is set and while the communication apparatus is brought in close alignment with the second apparatus by the user, without requiring the user to select via the operation part which data file to transmit; and releasing, by the relay transfer mode setting part of the communication apparatus, the relay transfer mode.

7. A non-transitory computer-readable medium encoded with a computer program, which when executed by a communication apparatus, causes the communication apparatus to perform a process comprising:

performing short-distance one-to-one communication with a communication partner apparatus including at least one of a first apparatus or a second apparatus via electric field coupling or magnetic field coupling, wherein performing communication comprises establishing communication between the communication apparatus and the first apparatus or the second apparatus while the communication apparatus is brought in close alignment with the first apparatus or the second apparatus by a user;

receiving file metadata transmitted from the first apparatus, the file metadata including data indicating file names and total number of data files to be transmitted from the first apparatus to the communication apparatus;

receiving data files from the first apparatus after the communication part has established communication between the communication apparatus and the first apparatus, and while a relay transfer mode is set; and determining, while the relay transfer mode is set, whether file transmission from the first apparatus has completed by determining whether a total number of data files received match the data included in the file metadata;

receiving a user operation from the user to set or release a relay transfer mode;

holding the data files received from the first apparatus in a storage part while the relay transfer mode is set; and transmitting automatically, if communication is established with the second apparatus, the data files held in the storage part to the second apparatus while the relay transfer mode is set and while the communication apparatus is brought in close alignment with the second apparatus by the user, without requiring the user to select via the operation part which data file to transmit.

8. The communication apparatus according to claim 1, wherein the storage part holds the file metadata received from the first apparatus.

9. The communication system according to claim 5, wherein the relay transfer mode setting part releases the relay transfer mode when user operates the operation part to release the relay transfer mode.

10. The communication system according to claim 5, wherein the transmission control part transmits a data file to the third communication apparatus with which communication is established after the reception processing part determines that the file transmission from the first communication apparatus has completed.

11. The communication system according to claim 5, wherein the second communication apparatus has a display processing part for displaying a setting or release of the relay transfer mode.

12. The communication system according to claim 5, wherein the storage part holds the file metadata received from the first communication apparatus.

13. The communication method according to claim 6, further comprising releasing the relay transfer mode when a release instruction is received from the user operation.

14. The communication method according to claim 6, further comprising transmitting a data file to the second apparatus with which communication is established after the reception processing part determines that the file transmission from the first apparatus has completed.

15. The communication method according to claim 6, further comprising displaying a setting or release of the relay transfer mode.

16. The communication method according to claim 6, further comprising holding the file metadata received from the first apparatus.

17. The non-transitory computer-readable medium of claim 7, wherein the process further comprises:

receiving an input of a release instruction of the relay transfer mode from the user operation, wherein the relay transfer mode is released when the release instruction is input.

18. The non-transitory computer-readable medium of claim 7, wherein the process further comprises:

displaying a setting or release of the relay transfer mode.

19. The non-transitory computer-readable medium of claim 7, wherein the storage part holds the file metadata received from the first apparatus.

20. The communication apparatus of claim 1, wherein the communication part establishes short-distance one-to-one communication with the first apparatus or the second apparatus via electric field coupling or magnetic field coupling when the communication apparatus is brought close to the first apparatus or the second apparatus within a distance of about 3 cm.

21. The communication apparatus of claim 1, wherein the communication part includes a first flat transmission electrode, the first apparatus includes a second flat transmission electrode, and the second apparatus includes a third flat transmission electrode, and wherein the communication part establishes short-distance one-to-one communication with the first apparatus or the second apparatus via electric field coupling or magnetic field coupling when the communication apparatus is brought close to the first apparatus or the second apparatus with the first flat transmission electrode facing the second flat transmission electrode or the third flat transmission electrode.

* * * * *